United States Patent [19]

Bowyer

[11] Patent Number: 4,464,143
[45] Date of Patent: Aug. 7, 1984

[54] CONSTANT VELOCITY RATIO UNIVERSAL JOINT

[75] Inventor: John T. Bowyer, Birmingham, England

[73] Assignee: Hardy Spicer Limited, Birmingham, England

[21] Appl. No.: 305,461

[22] Filed: Sep. 25, 1981

[30] Foreign Application Priority Data

Oct. 3, 1980 [GB] United Kingdom ............... 8031995

[51] Int. Cl.³ .............................................. F16D 3/30
[52] U.S. Cl. .................................... 464/146; 464/906
[58] Field of Search ............... 464/143, 145, 146, 906

[56] References Cited

U.S. PATENT DOCUMENTS

| | | | |
|---|---|---|---|
| 1,985,278 | 12/1934 | Bradley | 464/906 X |
| 3,310,961 | 3/1967 | Ristau | 464/146 |
| 3,789,626 | 2/1974 | Girguis | 464/906 X |
| 3,857,256 | 12/1974 | Girguis | 464/146 X |
| 4,012,925 | 3/1977 | Krude | 464/146 |
| 4,027,927 | 6/1977 | Turner | 464/146 X |
| 4,325,232 | 4/1982 | Girguis | 464/146 X |

FOREIGN PATENT DOCUMENTS 2275683 4/1976 France .
2375487 7/1978 France .

Primary Examiner—Stuart S. Levy
Assistant Examiner—Daniel P. Stodola
Attorney, Agent, or Firm—Marshall, O'Toole, Gerstein, Murray & Bicknell

[57] ABSTRACT

A plunging constant velocity ratio universal joint with inner and outer joint members having opposed pairs of straight grooves receiving balls for torque transmission, and a ball cage with inner and outer part-spherical surfaces, wherein the inner part-spherical surface of the cage engages a number of elements constrained to sliding movement along the lands between the grooves in the inner joint member. Each element may have a projection engaging in a groove in its land, and may be able to rotate about such projection. Frictional resistance to plunge of the joint is minimized by ensuring that the balls roll rather than skid along the grooves in the joint members.

4 Claims, 4 Drawing Figures

U.S. Patent   Aug. 7, 1984   4,464,143
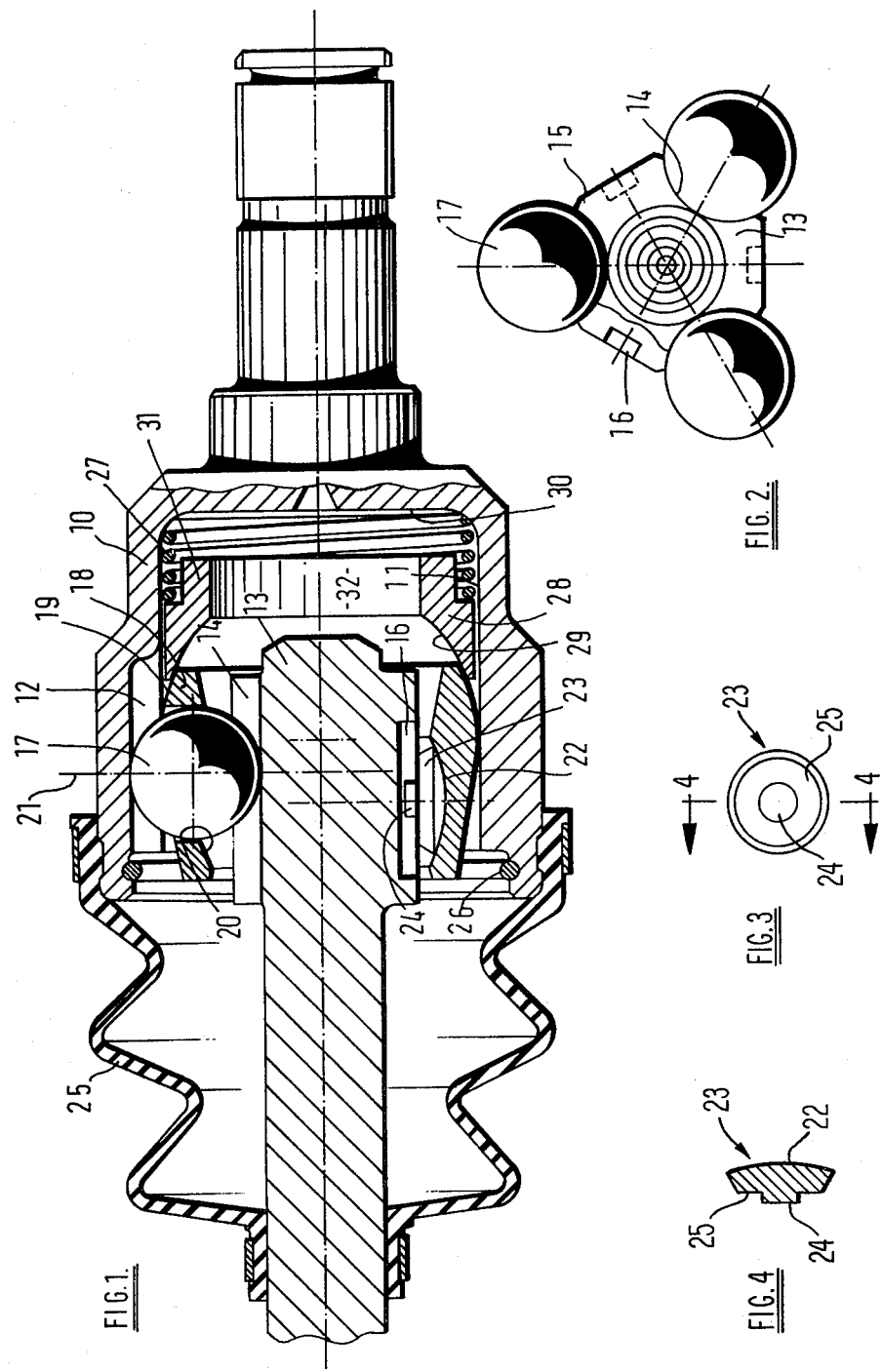

CONSTANT VELOCITY RATIO UNIVERSAL JOINT

BACKGROUND TO THE INVENTION

Field of the Invention

This invention relates to constant velocity ratio universal joints of the kind comprising a hollow outer member and an inner member, provided with pairs of opposed longitudinally extending grooves, a plurality of balls disposed one in each of said pairs of grooves for torque transmission between said members and movable along said grooves to permit relative angular and axial (plunging) movement between said members, and a cage disposed between the inner and outer joint members and having apertures in which said balls are received, said cage having part-spherical inner and outer surfaces which co-operate with respective surfaces associated with the inner and outer joint members so that the balls are maintained in a plane bisecting the angle between the rotary axes of the joint members to impart the required constant velocity ratio characteristics to the joint. Such a universal joint will hereafter be referred to as a universal joint of the kind specified.

One disadvantage of universal joints of the kind specified is that the balls can skid along the grooves in one or both joint members during plunge, rather than rolling along the grooves. Skidding of the balls produces an undesirably high friction resistance to plunge. If skidding is to be avoided, the cage (which is slidable axially of the outer joint member) is required to be slidable relative to the inner joint member by a distance equal to half the total permitted plunging movement of the joint, and in one construction proposed hitherto this has been achieved by having the inner part-spherical surface of the cage engage an annular component which is slidable axially of the inner joint member. However, such an annular component is complex and expensive to manufacture, and it is difficult to obtain the required range of movement thereof relative to the inner joint member.

SUMMARY OF THE INVENTION

According to the invention, we provide a universal joint of the kind specified wherein the inner part-spherical surface of the cage engages surfaces provided on a number of separate elements, each of which is disposed on a land between two adjacent grooves provided on the inner joint member and is constrained to sliding movement axially thereof.

By the provision of such separate elements, the complexity of providing a single slidable element with which the inner part-spherical surface of the cage engages is avoided.

Perferably each of said elements comprises an outer part with an external part-spherical surface which engages the part-spherical surface of the cage and an undersurface which bears against the land of the inner joint member, and an inwardly extending projection which engages in a groove formation extending along the land of the inner joint member to constrain the element relative to the joint member.

Preferably each of said elements is of circular form, with a circular projection engaging in its groove in the land of the joint member so that the element can rotate about its projection while sliding axially of the inner joint member. It is believed that under certain circumstances such permissible rotation of the elements can lead to a reduction in resistance to plunge of the joint.

A potential problem with universal joints according to the invention is that the joint cage and balls can migrate axially within the outer member when the joint rotates under its driving force.

To overcome this, there may be provided resilient means, operative between the cage and the outer joint member to bias the cage to a position generally in the mid region of its possible movement within the joint member. This provides a resistance to migratory axial movement of the cage and balls. By the provision of such resilient means it is possible to maintain the cage axially central relative to the plunge travel afforded by the inner and outer members so that the cage can move relative to both of these members in either axial direction when the joint is required to plunge under externally applied forces. Thereby the balls will always be able to roll along the grooves in the inner and outer joint members.

BRIEF DESCRIPTION OF THE DRAWINGS

The invention will now be described by way of example with reference to the accompanying drawings, of which FIG. 1 is an axial section through a constant velocity ratio universal joint according to the invention;

FIG. 2 is a part-sectional axial view of the inner member of the joint of FIG. 1;

FIG. 3 is a bottom view of the element shown in FIG. 1 which engages the inner part-spherical surface of the cage and the land between grooves on the inner joint member; and FIG. 4 is a sectional view taken along the line 4—4 of FIG. 3.

DESCRIPTION OF PREFERRED EMBODIMENTS

The illustrated universal joint comprises a outer member 10 of cup-like form with a cylindrical internal surface 11 in which are formed three parallel axially extending circumferentially spaced grooves 12.

Within the outer joint member 10 is disposed an inner joint member 13 which has three grooves 14 which face the grooves 12 in the outer joint member. Between the grooves 14 in the inner joint member are flat topped lands 15. A shallow rectangular section groove 16 extends axially along the major part of the length of the top surface of each land.

Three balls 17 are disposed between the inner and outer joint members, one in each pair of opposing grooves 12, 14. The balls are accommodated in respective apertures in a cage 18 which is of annular form occupying the space between the inner and outer joint members. The cage 18 has an outer part-spherical surface 19 and an inner part-spherical surface 20, the centres of curvature of these part-spherical surfaces being offset equally on opposite sides of a plane 21 which contains the centres of the balls 17.

The outer part-spherical surface 19 of the cage 18 contacts the cylindrical surface 11 of the outer joint member. The inner part-spherical surface 20 of the cage engages an external part-spherical surface 22 of each of three elements 23 (FIGS. 1, 3 and 4) which are provided on the lands between the grooves 14 in the inner joint member. Each element 23 has a flat undersurface 25 which bears against the flat top 15 of its land and an inwardly extending cylindrical projection 24 which is received in the groove 16 of its land. The elements 23 are thus able to slide axially of the inner joint member and rotate about the axes of their respective projections 24.

A compression spring 27 is disposed in the outer member 10, and abuts a reaction face 30 at the closed end thereof. An adaptor component 28 interfaces between the spring 27 and the cage 18, and affords a location spigot 31 for the spring and a part spherical internal surface 29 which engages the external part spherical surface 19 of the cage. These two part spherical surfaces co-operate to permit angular movement of the cage without adverse interference with the plunge movement of the cage. The adaptor component 28 is alidably engaged in the inner cylindrical surface 11 of the outer member 10, which provides stability for the adaptor and spring. A bore 32 is provided in the adaptor component to provide axial clearance for plunge travel of the inner joint member 13.

The joint is provided with a flexible sealing boot 25 in conventional menner for retaining lubricant, and a circlip 26 for limiting outward sliding movement of the inner joint member.

When plunging movement of the joint occurs, the cage can move axially relative to both the inner and outer joint members, the former by virtue of the permissible sliding movement of the elements 23 (FIGS. 1, 3 and 4) relative to the inner joint member and the latter by virtue of the normal sliding permissible between the outer part-spherical surface of the cage and the inner cylindrical surface 11 of the outer joint member. Because of this, the balls 17 can roll along the grooves of both the inner and outer joint members, thereby reducing frictional resistance to plunge which would exist if the balls merely skidded along the grooves of the outer joint member.

Because of the freedom of the cage and balls to move axially relative to both the inner and outer joint members, there may be a tendency for such movement to occur and bring the cage to one end of the outer joint member. Further movement cannot then occur in that direction upon plunge of the joint, producing a high resistance to such plunge. The direction in which the cage tends to move is determined by the geometry of the joint, and in the illustrated example where the external part-spherical surface of the cage has its centre axially offset from the plane of the balls, the migratory travel of the cage and balls can be controlled to more often occur in the direction of this offset from the plane of the ball centres.

Accordingly the spring 27 is positioned to the right of the cage in the illustrated example since the centre of the external part spherical surface of the cage is to the right of the plane of the balls. The spring will resist the migration of the cage to the closed end of the outer joint member. This is effective at all joint operating angles because of the part-spherical seating 29 in the adaptor component 28 which engages the cage.

In the illustrated embodiment, the elements 23 are of circular shape, and thus are relatively easy to manufacture. Further, the possible rotation of each element 23 about the axis of its projection 24 may facilitate sliding of the element, particular in the case where the rotational axes of the inner and outer joint members are not aligned, thereby providing a further advantageous reduction in resistance to plunge. However, it would be within the scope of the invention for the elements 23 to be of other form and constrained solely to axial sliding along the lands of the inner joint member.

I claim:

1. A constant velocity ratio universal joint comprising a hollow outer joint member with a cylindrical internal surface having longitudinally extending grooves therein, an inner joint member disposed within the outer joint member and having longitudinally extending grooves opposing those in the outer joint member, a plurality of balls disposed one in each opposing pair of grooves for torque transmission between said members and movable along said grooves to permit relative angular and axial movement between said members, and an annular cage disposed between the inner and outer joint members and having apertures in which said balls are received, said cage having a part-spherical outer surface which co-operates with the internal surface of the outer joint member between the grooves thereof, and a part-spherical inner surfaces which engages surfaces provided on a number of separate elements, and each element is disposed on a flat land between two adjacent grooves of the inner joint member, so that the balls are maintained in a plane bisecting the angle between the rotary axes of the joint members,
   each of said elements comprises an outer portion of circular form with an external part-spherical surface which engages the inner part-spherical surface of the cage,
   each element having a flat under surface which bears against the flat land of the inner joint member, and
   each element has on the flat under surface an inwardly extending cylindrical projection extending into an axial groove located along the flat land of the inner joint member, to constrain the element so that the element can rotate about the axis of such cylindrical projection as well as move axially relative to the inner joint member.

2. A universal joint according to claim 1 further comprising resilient means, operative between the cage and the outer joint member to only bias the cage to a position generally in the mid-region of its possible movement within the outer joint member.

3. A universal joint according to claim 2 wherein said resilient means comprises a spring, disposed between the cage and a reaction surface formed within the outer joint member at the closed end thereof.

4. A universal joint according to claim 3, further comprising an interface member between the cage and spring, such member affording a part spherical surface with which the cage engages.

* * * * *